Feb. 3, 1953  F. P. ALLES ET AL  2,627,088
PREPARATION OF ORIENTED COATED FILMS
Filed March 22, 1950
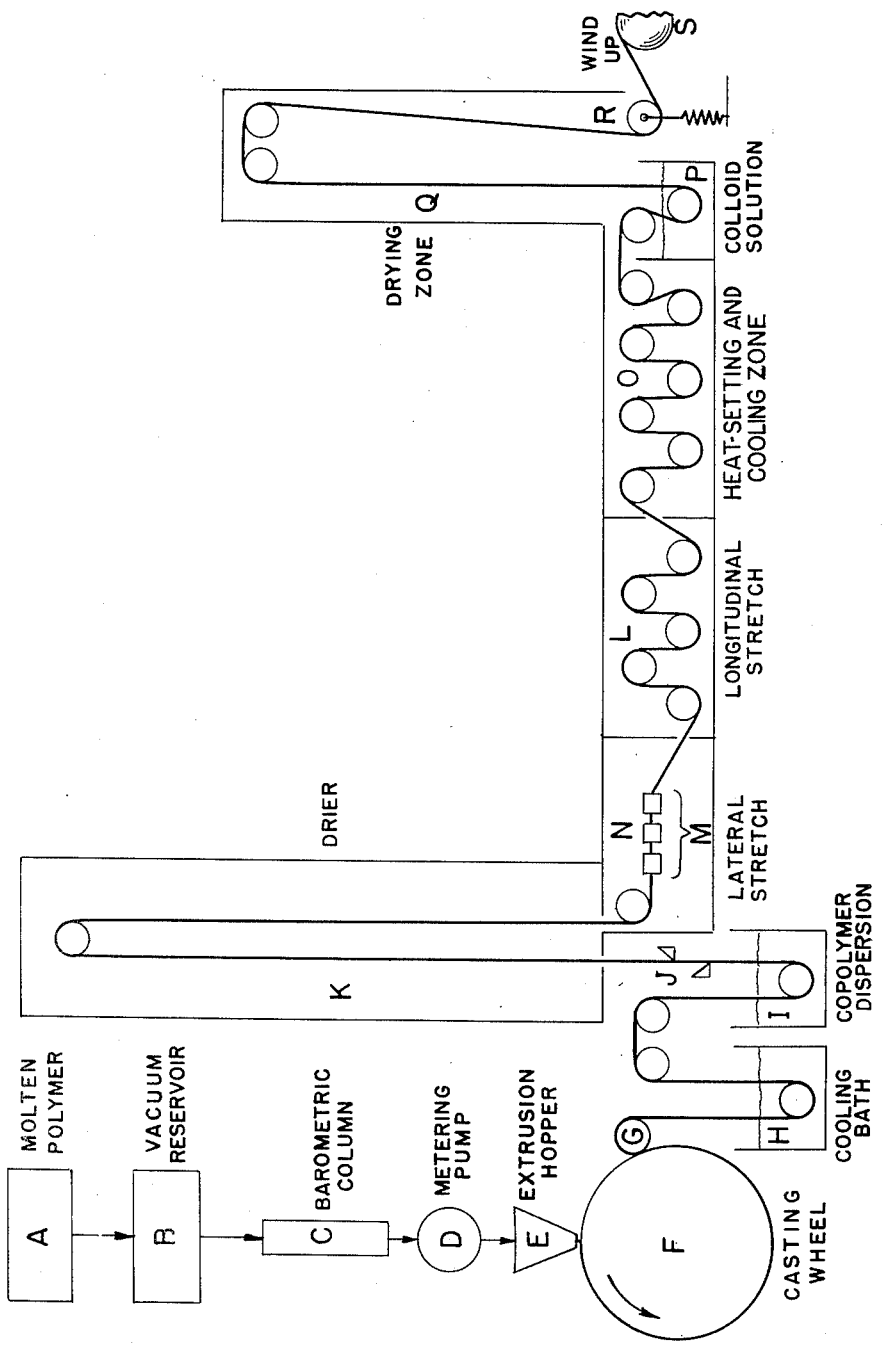
INVENTORS
FRANCIS PETER ALLES &
WILLIAM RUSSELL SANER
BY
Lynn Barratt Morris
ATTORNEY Patented Feb. 3, 1953

2,627,088

UNITED STATES PATENT OFFICE 2,627,088

PREPARATION OF ORIENTED COATED FILMS

Francis Peter Alles, Westfield, and William Russell Saner, Plainfield, N. J., assignors to E. I. du Pont de Nemours & Company, Wilmington, Del., a corporation of Delaware Application March 22, 1950, Serial No. 151,274

9 Claims. (Cl. 18—47.5)

This invention relates to the preparation of oriented coated films wherein the base is composed of a highly polymeric linear ester of a dicarboxylic acid with a dihydric alcohol and the coating or coatings are composed of a vinylidene chloride copolymer. The invention further relates to the preparation of photographic films from such composite oriented film base. More particularly, the invention relates to a process for the manufacture of photographic films embodying the steps of casting, coating, orienting, and applying of a colloid substratum and/or a light-sensitive colloid silver halide emulsion layer or layers.

Photographic film elements having a base composed of a super polyester, e. g., a highly polymeric linear polyester of a dicarboxylic acid with dihydric alcohol are described in Carother's U. S. P. 2,216,736. These polyesters are crystalline and high melting and fibers formed from them show, after stretching, molecular orientation along the fiber axis by characteristic X-ray patterns. Photographic films made from such esters while having the various advantages described in the patent have some disadvantages which must be overcome in commercial practice. Thus, it is difficult to secure the same degree of permanent adherence between such polyester films and gelatin layers which is attained with cellulose acetate and cellulose nitrate films.

Various proposals have been made to overcome the foregoing difficulty, but they are not always practical for large scale commercial production. Thus, applicants have coated stretched polyester film bases with an aqueous dispersion of a vinylidene chloride copolymer with 4 to 65% by weight of a vinyl compound but the aqueous dispersion does not have sufficient adhesion to the base for a high quality commercial product. The use of organic solvent solutions of a vinylidene chloride copolymer improves anchorage but requires solvent recovery apparatus which increases the cost of manufacture. Furthermore, the known solvents are toxic and may have an adverse photographic effect.

An object of this invention is to improve the art of making coated films of highly polymeric linear esters of dicarboxylic acids and dihydric alcohols. A further object is to provide a satisfactory photographic film base which can be coated with water-permeable colloid layers with a high degree of anchorage between the base and such layers. A still further object is to provide an economical and practical process for continuously casting a polyester film, coating it with a hydrophobic copolymer layer and orienting the coated film base, e. g., by biaxially stretching it. Yet another object is to provide such a continuous process with the additional step or steps of applying a water-permeable colloid layer and/or light-sensitive colloid silver halide emulsion layer. Still other objects will be apparent from the following description of the invention.

The above objects can be attained in accordance with this invention by applying to a film of a highly polymeric ester of a dicarboxylic acid and a dihydric alcohol having a melting point from 150-300° C. a thin coating of a copolymer of vinylidene chloride with 1 or 2 polymerizable vinyl or vinylidene compounds and biaxially orienting the coated polyester film at an elevated temperature. The copolymers should contain at least 35% of vinylidene chloride. The coating or coatings, in general, need only have a thickness which is a fraction of the thickness of the polyester film. Thicknesses of 1 to 5 microns are usually sufficient. The biaxial orientation of the polyester film while reducing its thickness by about ½ to ⅙ or more and increasing its area 2 to 9 times, surprisingly, does not have any adverse effect upon the adherence of the coating of the vinylidene chloride copolymer even though it is also stretched to a considerable extent.

In an important aspect of the invention one or both surfaces of the cast film of the highly polymeric linear ester is coated with an aqueous dispersion of the hydrophobic vinylidene chloride copolymer, the layers are then dried, e. g., at a temperature of 90 to 100° C. and the coated film is biaxially stretched at an elevated temperature, e. g., 70° C. to 120° C. The stretching may be accomplished in two stages, laterally and longitudinally, in either order or simultaneously. When the stretching is done in two steps the temperature in the second stage should be at least that used in the first stage and can advantageously be about 5 to 30 degrees higher but, in general, should be below 120° C.

A preferred aspect of this invention is concerned with a continuous process for the manufacture of a photographic film base including casting, coating, biaxially stretching and applying a colloid anchoring sublayer or layers. This aspect will now be described with an exemplary procedure and reference to the accompanying schematic drawing.

An ethylene glycol/terephthalic acid polyester having a melting point above 200° C. is made after the manner described in U. S. Patent 2,465,319 by carrying out the polymerization at 215 to 285° C. under a vacuum of 0.5 mm. in reaction vessel A. The molten polymer is run into a vacuum reservoir B maintained at a temperature of 265 to 275° C. and 0.5 to 10 mm. pressure. The molten polyester is led directly to a metering pump D or through a barometric column C at a temperature of 265–275° C. When a barometric column is used the pressure will be increased gradually to 760 mm. The polyester leaves the metering pump at a pressure of 50–200 pounds per square inch and temperature 265 to 300° C. and passes into an extrusion hopper E which is maintained at about the same temperature. The molten polyester is extruded at a rate of 15 to 250 inches per minute through a long narrow slot or orifice having a width, for example, of 0.09 inch onto the surface of a casting wheel F maintained at about 15–85° C. depending upon thickness of the film cast and the speed of casting. Generally the wheel should have a peripheral speed of 60 to 1000 inches per minute. The polyester solidifies on the casting wheel and the solidified film is taken off over roller G and led to a tank H containing water at 18 to 25° C. From H the film is led through a bath I containing an aqueous dispersion of a hydrophobic vinylidene chloride copolymer, e. g., a vinylidene chloride/acrylic ester/itaconic acid copolymer whereby a thin layer of copolymer is applied to each surface of the polyester film. In an alternative procedure the film can be led from roller G to bath I if desired. The thickness of the coating is regulated by means of doctor knives J. In a further alternative procedure the copolymer dispersion can be applied to one surface of the polyester film while it is supported on the casting wheel.

The coated polyester film is then led into a drying zone K where it is dried at a temperature of about 90° to about 100° C. The dry, coated film then is laterally stretched 1.5 to 5 times in unit width at zone L on tenter belts or rolls as schematically shown at M and passes into chamber N where it is stretched longitudinally 1.5 to 5 times in unit length at a temperature of about 100° to 105° C. and heat-set in zone O at a temperature of 115° to 150° C. while under tension or under conditions so that no substantial shrinkage occurs. The biaxially oriented coated polyester film base is then cooled to less than 100° C. It is passed through a bath P containing an aqueous gelatin solution where a thin gelatin sublayer is applied to each surface of the coated film base from a solution of the following composition:

| | Per cent |
|---|---|
| Gelatin | 2.0 |
| Water | 98.0 | and then passed into drying zone Q maintained at a temperature of 100° to 105° C. The drying is preferably carried out with substantially no tension on the film. In place of the aqueous solution of gelatin, a dispersion of gelatin in organic solvents may be used. The gelatin subbed film is passed under roll R which can be maintained under a slight tension and then led to a wind-up station S or it may be first coated with a gelatino silver halide emulsion and then dried, and passed to a wind-up station.

Various types of vinylidene chloride copolymer dispersions can be applied to the cast and quenched polyester film before the biaxial stretching is accomplished. Vinylidene chloride copolymers useful for coating the polyester film base include those containing from 4 to 65% of a different polymerizable vinyl or vinylidene compound or a mixture of such compounds. Suitable compounds are represented by the general formula:

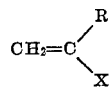

where R is hydrogen, an alkyl radical, e. g., methyl and ethyl or a halogen, e. g., Cl, Br and F, and X is a hydrocarbon radical, e. g., methyl, phenyl, or naphthyl or a negative group, e. g., halogen, such as chlorine, bromine and fluorine, —NO, —NO$_2$, —CN, —COOH, —SO$_3$H, —CONH$_2$, —CONHR′, —CONR′$_2$,

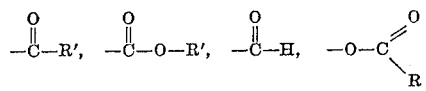

and ether radicals, e. g., —OR″; wherein R and R′ is an alkyl radical and R″ is an alkyl or aryl radical.

There are various known ways of making the aforedescribed copolymers which contain at least 35% by weight of vinylidene chloride. Suitable methods are described in United States Patents 2,160,903 and 2,160,931 to 2,160,943 inclusive, 2,160,945, 2,160,946 and 2,160,947. In making the copolymers there may be used such materials as vinyl acetate, vinyl propionate, vinyl chloroacetate, vinyl chloride, vinyl bromide; methyl or butyl acrylates; methyl, isobutyl, methoxyethyl, chloroethyl, or 2-nitro-2-methyl-propyl methacrylates; methyl or octyl alpha-chloroacrylates; methyl vinyl ketone, methyl isopropenyl ketone; itaconic acid acrylonitrile, methacrylonitrile; styrene, isobutylene; vinyl naphthalene; ethyl vinyl ether, butyl vinyl ether; N-vinyl phthalimide, N-vinyl succinimide, N-vinyl carbazole; methylene diethyl malonate, and the like or mixtures of two or more of these compounds. Representative copolymers of this type and suitable dispersions and their preparation are described in Alles et al. U. S. Patent 2,491,023.

A preferred class of copolymers are those of vinylidene chloride, an acrylic ester and itaconic acid. In order that these tri-component copolymers will have an adequate degree of adherence to the film base and to a water-permeable colloid layer and the requisite degree of flexibility, it is essential that the initial relative proportions of monomers in the reaction mixture be within the following ranges:

| Monomer | Range | Preferred Range |
|---|---|---|
| | Percent | Percent |
| Vinylidene chloride | 35.0 to 96 | 75 to 95 |
| Acrylic ester | 3.5 to 64.5 | 4 to 20 |
| Itaconic acid | 0.5 to 25 | 1 to 5 |

The useful acrylic esters which may be used in the copolymers are the alkyl esters of acrylic and methacrylic acids having from 1 to 18 carbon atoms in the alkyl group (e. g., methyl methacrylate, ethyl methacrylate, butyl methacrylate, octamethacrylate, n-dodecyl methacrylate, n-octadecyl methacrylate, methylacrylate, ethylacrylate and propylacrylate; vinyl chloride, acrylonitrile and methacrylonitrile).

The monomers may be copolymerized by any known method to form the copolymers used in accordance with this invention. For example, the copolymerization may be conducted in aqueous emulsion containing a mixture of the monomers, a catalyst and activator, e. g., ammonium persulfate and meta sodium bisulfite, and an emulsifying and/or dispersing agent. Alternatively, the copolymers of this invention may be prepared by polymerization of the monomeric components in bulk without added diluent, or the monomers may be reacted in appropriate organic solvent reaction media. The total catalyst-activator concentration should generally be kept within a range of about 0.01% to about 2.0% by weight of the monomer charge, and preferably within a range of concentration of 0.1% to 1.0%. Improved solubility and viscosity values are obtained by conducting the polymerization in the presence of mercaptans such as ethyl mercaptan, lauryl mercaptan, tertiary dodecyl mercaptan, etc., which are effective in reducing crosslinking in the copolymer. In general, the mercaptans should be used in concentrations of 0.1% to 5.0% by weight, based on the weight of polymerizable monomers present in the charge.

The invention will be further illustrated but is not intended to be limited by the following examples. The parts are by weight.

*Example I*

A vinylidene chloride-methylacrylate-itaconic acid copolymer is made by admixing the following constituents in a reaction vessel:

| | Grams |
|---|---|
| Vinylidene chloride | 90.00 |
| Methyl acrylate | 10.00 |
| Itaconic acid | 2.00 |
| Water | 100.00 |
| Ammonium persulfate | 0.50 |
| Sodium metabisulfite | 0.25 |
| Sodium dodecyl sulfate mixture [1] | 2.00 |

[1] A mixture of sodium alkyl sulfates of 8 to 16 carbon atoms predominating in sodium dodecyl sulfate.

The reaction vessel is heated to about 34° C. and stirring continued until all the vinylidene chloride is consumed, as indicated by cessation of reflux. The time required is about 1 hour 50 minutes. At this point two grams of the condensation product of sodium beta-naphthalene sulfonate and formaldehyde is stirred in, the emulsion cooled and filtered. This copolymer dispersion is used in bath I as described above.

An ethylene glycol/terephthalic acid polyester having a melting point above 200° C. is then cast, cooled, coated, biaxially stretched, provided with a thin gelatin sublayer, dried and passed to a wind-up station under the temperature, pressure and other conditions set forth in the exemplary procedure described above. The resulting non-light-sensitive film had excellent mechanical strength and flexibility. It also had excellent dimensional stability, great brilliance and clarity, toughness and stiffness. A gelatino silver halide emulsion layer was coated onto the gelatin sublayer on each surface of the film and after drying was found to have excellent dry adherence to the film base. It was exposed, developed, washed, fixed, washed and dried in the conventional manner and the wet and dry anchorage was likewise found to be excellent.

*Example II*

The following materials were heated to approximately 35° C. in a three-neck flask fitted with a stirrer and a reflux condenser:

| | Grams |
|---|---|
| Vinylidene chloride | 188 |
| Methyl acrylate | 12 |
| Itaconic acid | 4 |
| Water | 200 |
| Ammonium persulfate | 0.7 |
| Sodium metabisulfite | 0.35 |
| Sodium dodecyl sulfate mixture (see Example I) | 4 |

The stirring was continued until the refluxing of the vinylidene chloride had stopped. At this point 4 grams of sodium β-naphthalene monosulfonate condensed with formaldehyde dissolved in water were added and the dispersion cooled. One part of the dispersion was diluted with three parts of water and sufficient of the sodium alkylsulfate mixture described above added to the diluted dispersion to promote good wetting of the polyester film base surface (approximately 5 cc. of a 5% aqueous solution per 100 cc. of emulsion). This copolymer dispersion or latex was substituted in bath I for that of Example I and the polyester film cast, coated, stretched, etc., as in that example with similar results.

*Example III*

The following materials were heated to approximately 40° C. in a three-neck flask fitted with a stirrer and a reflux condenser:

| | Grams |
|---|---|
| Vinylidene chloride | 93 |
| Acrylonitrile | 7 |
| Ammonium persulfate | 0.35 |
| Sodium metabisulfite | 0.175 |
| Water | 100 |
| Sodium dodecyl sulfate mixture (see Example I) | 2 |

The stirring was continued until the refluxing of the vinylidene chloride had stopped. At this point, 2 grams of sodium β-naphthalene sulfonate condensed with formaldehyde, dissolved in water, were added and the emulsion was cooled. The copolymer dispersion or latex was substituted in bath I for that of Example I and the polyester film cast, coated and stretched as in that example. The stretched film was coated on both sides with a gelatin dispersion of the following composition:

| | Per cent |
|---|---|
| Gelatin | 0.8 |
| Acetic acid | 4.0 |
| Acetone | 55.0 |
| Methanol | 40.2 |

After drying, a gelatino-silver halide emulsion was coated onto the gelatin sublayer on each surface of the film with similar results.

*Example IV*

The following materials were heated to approximately 50° C. in a three-neck flask fitted with a stirrer and a reflux condenser:

| | Grams |
|---|---|
| Vinylidene chloride | 60 |
| Ethyl acrylate | 40 |
| Itaconic acid | 2 |
| Water | 100 |
| Sodium dodecyl sulfate mixture (see Example I) | 2 |
| Ammonium persulfate | 0.35 |
| Sodium metabisulfite | 0.175 |

The stirring was continued until the refluxing of the vinylidene chloride had stopped. At this point, 2 grams of sodium β-naphthalene sulfonate condensed with formaldehyde, dissolved in water, were added and the dispersion was cooled. The copolymer dispersion or latex was substituted in bath I for that of Example III and the polyester film cast, coated, stretched, etc., as in that example with similar results.

*Example V*

The following materials were heated to approximately 50° C. in a three-neck flask fitted with a stirrer and a reflux condenser:

| | Grams |
|---|---|
| Vinylidene chloride | 40 |
| Ethyl acrylate | 60 |
| Itaconic acid | 2 |
| Water | 100 |
| Ammonium persulfate | 0.35 |
| Sodium metabisulfite | 0.175 |
| Sodium dodecyl sulfate mixture (see Example I) | 2 |

The stirring was continued until the refluxing had stopped. At this point, 1 gram of sodium β-naphthalene sulfonate condensed with formaldehyde, dissolved in water, were added and the dispersion was cooled. The copolymer dispersion or latex was substituted in bath I for that of Example III and the polyester film cast, coated, stretched, etc., as in that example with similar results.

*Example VI*

The following materials were heated to approximately 35° C. in a three-neck flask fitted with a stirrer and a reflux condenser:

| | Grams |
|---|---|
| Vinylidene chloride | 170 |
| Methyl acrylate | 30 |
| Itaconic acid | 1 |
| Water | 200 |
| Ammonium persulfate | 0.7 |
| Sodium metabisulfite | 0.35 |
| Sodium dodecyl sulfate mixture (see Example I) | 4 |

The stirring was continued until the refluxing of the vinylidene chloride had stopped. At this point, 4 grams of sodium β-naphthalene sulfonate condensed with formaldehyde, dissolved in water, were added and the dispersion was cooled. The copolymer dispersion or latex was substituted in bath I for that of Example I and the polyester film cast, coated and stretched three times in a lateral direction. The stretched film was coated on both sides with a gelatin dispersion of the following composition:

| | Per cent |
|---|---|
| Gelatin | 1 |
| Water | 1 |
| Salicylic acid | 0.5 |
| Methanol | 97.5 |

After drying, a gelatino silver halide emulsion was coated onto the gelatin sublayer on each surface of the film with similar results.

*Example VII*

An ethylene glycol/terephthalic acid polyester having a melting point above 200° C. was cast, cooled and coated with a copolymer dispersion of the type described in Example I. The film was then stretched biaxially and coated on both sides with the following solution:

| | Per cent |
|---|---|
| Polyvinyl alcohol (77% hydrolyzed; viscosity of 20 centipoises in 4% aqueous solution at 20° C.) | 1 |
| Water | 95 |
| Ethanol | 4 |

After drying, the film was coated with a polyvinyl acetal color former-silver halide emulsion containing 1.5% by weight of silver iodobromide, comprised of approximately 1.3% silver iodide and 98.7% silver bromide, dispersed in the polymeric color former (3.8% by weight of the total emulsion) described in U. S. patent application, Ser. No. 9330, filed February 18, 1948, now U. S. Patent 2,513,190. After drying, the emulsion was found to have good adherence to the film base. It was exposed, developed, washed, fixed, washed and dried in the conventional manner and the wet and dry anchorage was likewise found to be satisfactory.

The copolymer and gelatin dispersions may be deposited on the support or film base by any of the conventional methods used in the manufacture of photographic elements, e. g., by immersion of the surfaces of the film into a solution of the coating material, spraying, beading or coating from a hopper provided with a doctor blade, etc. The thickness of the layer may vary over a fairly wide range, e. g., 0.05 mil to 1.0 mil or more. In general, however, from 0.1 to 0.2 mil coatings will be most useful.

The dispersions can be obtained directly from the polymerization reaction medium when the copolymer is made by emulsification polymerization technique. They may contain various wetting and dispersing agents, e. g., n-alkane sulfonic and sulfuric acid alkali metal, ammonium and amine salts of 10 to 18 carbon atoms, C- and N-alkylbetaines of 10 to 20 carbon atoms; the methyl, ethyl and isopropyl naphthalene sulfonic acid alkali metal salts, etc. From 0.05 to 2% by weight of the dispersing agent is generally sufficient.

The invention is not limited to the particular conditions stated in the above exemplary procedures or examples but on the contrary those conditions may vary widely. Thus, the extrusion speeds may vary from 1 to 25 feet per minute and the casting wheels peripheral speed may vary from 3 to 100 feet per minute.

Various radiation-sensitive materials may be present in the layers coated onto the anchoring substrata. In addition to light-sensitive silver salts, such as silver chloride, silver bromide, silver-chloride-bromide, silver-chloride-iodide and similar mixtures, there may be utilized bichromated hydrophilic colloids, e. g., albumin, gelatin, gum arabic, polyvinyl alcohols, or glue. Immobile color formers, dye intermediates or dyes may be present in such layers. Other materials include light-sensitive iron salts and diazonium compounds with or without coupling components. With certain of these light-sensitive materials, e. g., the diazo compounds, the binding agent may have a low sensitivity to water. Thus, polyvinyl acetate or a cellulose acetate may be used as the colloidal binder.

The polyester film base may contain a pigment or dye to color it any desired color. When the base is to be used for X-ray film it may be tinted blue or green. The copolymer layer may be similarly tinted and may contain an antistatic material. Antistatic layers and antihalation layers can be coated on the copolymer layer.

An important feature of the invention is exemplified in Example VII where hydrophilic hydroxyl polymer silver-halide emulsions are anchored to supports by means of the water-soluble polyvinyl alcohol described above. Heretofore, anchorage of such colloids has been poor and difficult to accomplish as the conventional gelatin substrata were ineffective. Additional synthetic colloids which can be anchored by these methods include polyvinyl alcohols and water-soluble polyvinyl alcohol derivatives in general, e. g., partially hydrolyzed polyvinyl acetates, and mixed polyvinyl-chloride-acetates, hydrolyzed interpolymers of vinyl acetate with unsaturated compounds, for example, maleic anhydride, acrylic acid esters, etc. Suitable colloids of the last mentioned types are disclosed in United States Patents 2,276,322, 2,276,323 and 2,397,866. Still other colloids include hydrophilic partially substituted polyvinyl esters and acetals and the low substituted cellulose esters of saturated aliphatic monocarboxylic acids of 2 to 4 carbon atoms and low substituted cellulose ethers, e. g., methyl-cellulose, ethyl-cellulose, etc. Additional natural colloids include casein, albumin, gum arabic, agar agar, polyglycuronic acid, etc., which are also anchored to supports by these new substrata.

It is difficult to anchor a colloid sublayer, e. g., a thin gelatin layer to a film base because the solvents used in the conventional subbing solutions do not have any solvent action on the polyester film surface. The present invention overcomes this disadvantage and provides a practical method for anchoring gelatin layers to polyester film bases.

It is emphasized that the vinylidene chloride copolymer aqueous dispersions when coated onto biaxially oriented polyester film base do not satisfactorily adhere to it. By first applying the dispersion of copolymer to unstretched polyester film base and then orienting it, e. g., by biaxially stretching the coated film, an entirely unexpected high degree of adherence is obtained.

An advantage of the invention is that it provides oriented coated polyester films of high quality. Another advantage is that it provides a practical method of making such films. A further advantage of the invention is that the method can be applied to continuous lengths of film at relatively high speeds. A still further advantage is that it provides a novel and effective method of obtaining a biaxially oriented polyester film with surfaces that are strongly adherent to water-permeable colloid layers. A still further advantage is that it provides a practical continuous method of casting, coating, stretching and subbing a photographic film base.

As many widely different embodiments of this invention can be made without departing from the spirit and scope thereof, it is to be understood that the invention is not to be limited except as defined by the claims.

What is claimed is:

1. The method which comprises casting into the form of a film a molten highly polymeric ester of a dicarboxylic acid and a dihydric alcohol, said ester being capable of being formed into filaments which when cold drawn show by characteristic X-ray patterns molecular orientation along the fiber axis, coating at least one surface of the film with an aqueous dispersion of a copolymer containing at least 35% by weight of vinylidene chloride, drying the coated polymeric ester film and orienting the coated film by stretching it at an elevated temperature.

2. The method which comprises casting into the form of a film a molten highly polymeric ester of a dicarboxylic acid and a dihydric alcohol, said ester having a melting point from 150 to 300° C. and being capable of being formed into filaments which when cold drawn show by characteristic X-ray patterns molecular orientation along the fiber axis, coating at least one surface of the polyester film with an aqueous dispersion of a copolymer, containing at least 35% by weight of vinylidene chloride, drying the coated polymeric ester film and biaxially orienting the coated film by laterally and longitudinally stretching at an elevated temperature.

3. The method which comprises casting into the form of a film a molten highly polymeric ester of a dicarboxylic acid and a dihydric alcohol, said ester having a melting point from 150 to 300° C. and being capable of being formed into filaments which when cold drawn show by characteristic X-ray patterns molecular orientation along the fiber axis, cooling the cast film, coating at least one surface of the film with an aqueous dispersion of a hydrophobic copolymer, of vinylidene chloride and 1 to 2 different polymerizable compounds taken from the group consisting of vinyl and vinylidene compounds containing 35 to 96% by weight of vinylidene chloride, drying the coated polyester film, biaxially orienting the coated film by laterally and longitudinally stretching it at an elevated temperature and coating at least one of the copolymer surfaces with an aqueous solution containing a water-permeable colloid.

4. The method which comprises casting under pressure into the form of a thin film a molten highly polymeric ester of a polymethylene glycol containing 2 to 10 methylene groups and terephthalic acid, said ester having a melting point from 200 to 300° C., cooling the cast film to a temperature below 85° C., coating at least one surface of the film with an aqueous dispersion of a highly hydrophobic vinylidene chloride copolymer containing 35 to 96% by weight of vinylidene chloride, drying the coated polymeric ester film, and biaxially orienting the coated film by laterally and longitudinally stretching at an elevated temperature, heating the stretched film without dimensional change and then allowing it to cool.

5. The method which comprises casting under pressure into the form of a thin film a molten highly polymeric ester of a polymethylene glycol containing 2 to 10 methylene groups with terephthalic acid having a melting point from 200 to 300° C., cooling the cast film to a temperature below 85° C., coating at least one surface of the film with an aqueous dispersion of a highly hydrophobic vinylidene chloride copolymer with 1 to 2 different polymerizable compounds taken from the group consisting of vinyl and vinylidene compounds containing 75 to 95% of vinylidene chloride, drying the coated polymeric ester film, and biaxially orienting the coated film by laterally and longitudinally stretching it at an elevated temperature, maintaining the stretched film at an elevated temperature without dimensional change, allowing it to cool and coating at least one of the copolymer surfaces with an aqueous solution containing a water-permeable colloid.

6. The method which comprises casting under pressure into the form of a thin film a molten highly polymeric ester of a polymethylene glycol containing 2 to 10 methylene groups with terephthalic acid having a melting point from 200 to 300° C., cooling the cast film, coating at least one surface of the film with an aqueous dispersion of a highly hydrophobic copolymer containing at least 35% of vinylidene chloride, drying the coated polymeric ester film, biaxially orienting the coated film by laterally and longitudinally stretching it at an elevated temperature, maintaining the stretched film at an elevated temperature without dimensional change, allowing it to cool and coating at least one of the copolymer surfaces with an aqueous solution containing a colloid containing a plurality of recurring intralinear

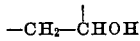

groups.

7. The method which comprises casting under pressure into the form of a thin film a molten highly polymeric ester of a polymethylene glycol containing 2 to 10 methylene groups with terephthalic acid having a melting point from 200 to 300° C., cooling the cast film, coating at least one surface of the film with an aqueous dispersion of a highly hydrophobic copolymer containing 35 to 96% by weight of vinylidene chloride, 3.5 to 64.5% acrylic ester and 0.5 to 25% itaconic acid, drying the coated polymeric ester film, biaxially orienting the coated film by laterally and longitudinally stretching it at an elevated temperature, maintaining the stretched film at an elevated temperature without dimensional change, allowing it to cool and coating at least one of the copolymer surfaces with an aqueous solution containing a water-permeable colloid.

8. The method which comprises casting under pressure into the form of a thin film a molten highly polymeric ester of a polymethylene glycol containing 2 to 10 methylene groups with terephthalic acid having a melting point from 200 to 300° C., cooling the cast film, coating at least one surface of the film with an aqueous dispersion of a highly hydrophobic vinylidene chloride copolymer with 1 to 2 different polymerizable compounds taken from the group consisting of vinyl and vinylidene compounds containing 75 to 95% of vinylidene chloride, drying the coated polymeric ester film, biaxially orienting the coated film by laterally and longitudinally stretching it at an elevaed temperature, maintaining the stretched film at an elevated temperature without dimensional change, allowing it to cool, coating at least one of the copolymer surfaces with an aqueous solution containing gelatin and coating a water-permeable colloid silver halide emulsion layer on at least one of the gelatin sublayers.

9. The method which comprises casting under pressure into the form of a thin film a molten highly polymeric ester of a polymethylene glycol containing 2 to 10 methylene groups with terephthalic acid having a melting point from 200 to 300° C., cooling the cast film, coating at least one surface of the film with an aqueous dispersion of a highly hydrophobic copolymer containing 75 to 95% by weight of vinylidene chloride, 4 to 20% acrylonitrile and 1 to 5% itaconic acid, drying the coated polymeric ester film, biaxially orienting the coated film by laterally and longitudinally stretching it at an elevated temperature, maintaining the stretched film at an elevated temperature without dimensional change, allowing it to cool and coating at least one of the copolymer surfaces with an aqueous solution containing a water-permeable colloid.

FRANCIS PETER ALLES.
WILLIAM RUSSELL SANER.

REFERENCES CITED

The following references are of record in the file of this patent:

UNITED STATES PATENTS

| Number | Name | Date |
| --- | --- | --- |
| 1,808,998 | Sheppard et al. | June 9, 1931 |
| 2,216,736 | Carothers | Oct. 8, 1940 |
| 2,286,569 | Pollack | June 16, 1942 |
| 2,491,023 | Alles et al. | Dec. 13, 1949 |